United States Patent
Bibikar et al.

(10) Patent No.: US 7,302,600 B2
(45) Date of Patent: Nov. 27, 2007

(54) POWER SUPPLY DETECTION METHOD, APPARATUS, AND SYSTEM

(75) Inventors: Vasudev J. Bibikar, Austin, TX (US); Mark N. Fullterton, Austin, TX (US); James R. Feddeler, Austin, TX (US)

(73) Assignee: Marvell International Ltd., Hamilton (BM)

( * ) Notice: Subject to any disclaimer, the term of this patent is extended or adjusted under 35 U.S.C. 154(b) by 378 days.

(21) Appl. No.: 10/880,762

(22) Filed: Jun. 30, 2004

(65) Prior Publication Data

US 2006/0005060 A1   Jan. 5, 2006

(51) Int. Cl.
*G06F 1/00* (2006.01)
(52) U.S. Cl. ............... 713/324; 713/330; 323/282
(58) Field of Classification Search ........... 713/330, 713/320, 323, 324; 323/282, 283; 327/143
See application file for complete search history.

(56) References Cited

U.S. PATENT DOCUMENTS

| | | | | | |
|---|---|---|---|---|---|
| 5,414,307 | A | * | 5/1995 | Brandmaier | 327/143 |
| 5,703,932 | A | * | 12/1997 | Oda | 455/566 |
| 6,507,283 | B1 | * | 1/2003 | Calvin | 340/644 |
| 6,870,353 | B2 | * | 3/2005 | Inaba | 323/282 |
| 6,870,403 | B2 | * | 3/2005 | Horie et al. | 327/63 |
| 7,058,835 | B1 | * | 6/2006 | Sullivan et al. | 713/324 |

* cited by examiner

*Primary Examiner*—Suresh K Suryawanshi

(57) ABSTRACT

Circuits in a processor may provide an indication that power supplies are ready when waking from a reduced power state. The processor may include timers to measure a period of time, and may utilize voltage detectors to detect the voltages on the power supplies. A control register in the processor may influence the operation.

25 Claims, 7 Drawing Sheets

POWER SUPPLY DETECTION METHOD, APPARATUS, AND SYSTEM

FIELD

The present invention relates generally to electronic systems, and more specifically to the ramping up of power supplies in electronic systems.

BACKGROUND

Processors typically receive power to operate when included in a system. The power may be received directly from one or more batteries, or from a power management integrated circuit or system, or the like. When waking from a reduced power mode, it may take time for power supply voltages to stabilize, or to "ramp up." For example, a processor may be in a sleep mode in which one or more power supply voltages may not be provided to the processor. When exiting the sleep mode, it may take time for the power supply voltages to reach a sufficient value for the processor to operate correctly.

DESCRIPTION OF EMBODIMENTS

Figure 1:
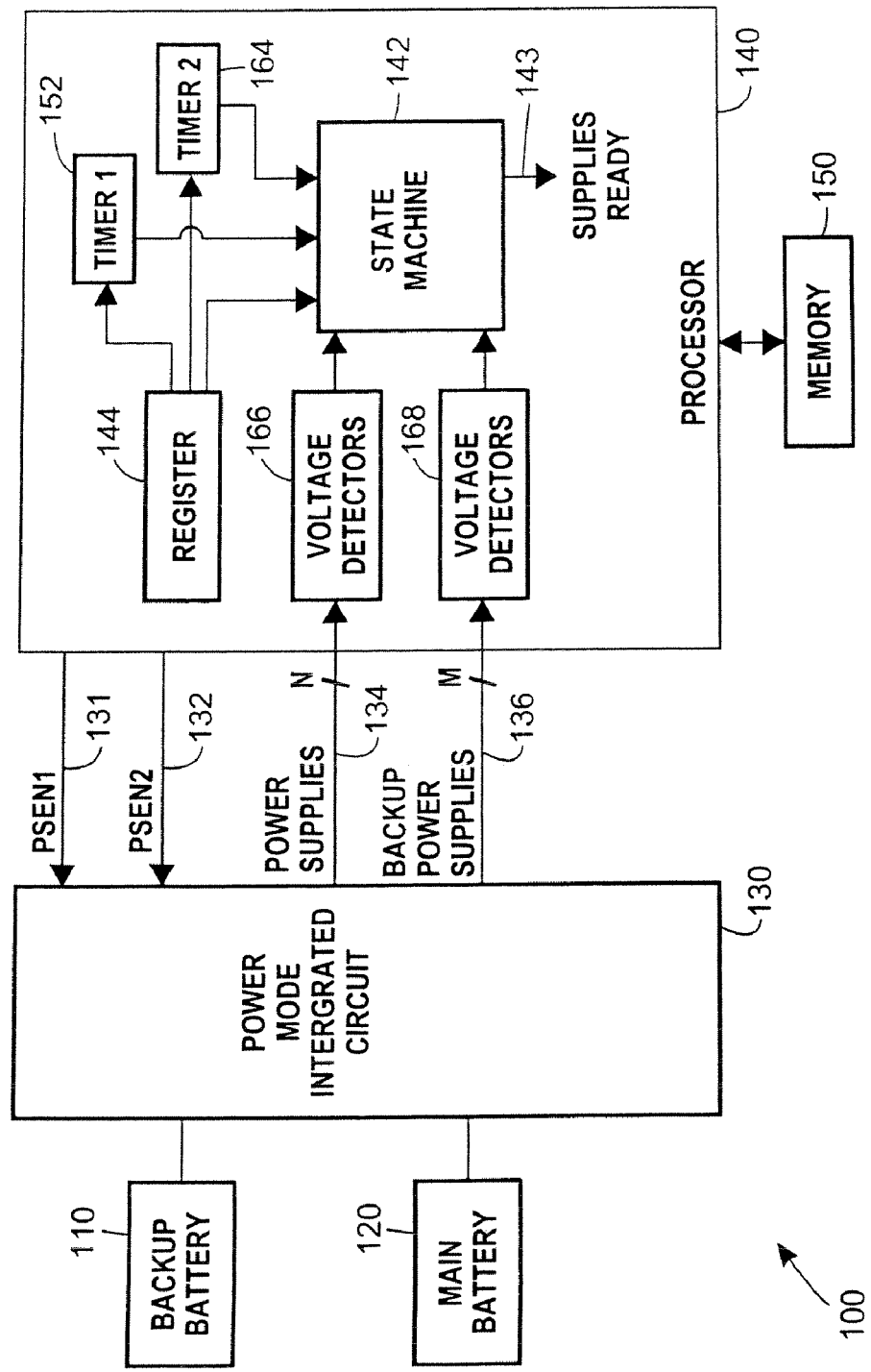
FIG. 1 shows an electronic system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an electronic system in accordance with various embodiments of the present invention. Electronic system 100 includes back-up battery 110, main battery 120, power mode integrated circuit (PMIC) 130, processor 140, and memory 150. Processor 140 may be any type of processor. For example, in some embodiments, processor 140 may be a microprocessor, a digital signal processor, an embedded micro-controller, or the like. In some embodiments, PMIC 130 is coupled to processor 140 by multiple signal paths and other conductors. For example, as shown in FIG. 1, PMIC 130 provides processor 140 with power supply voltages on power supplies 134 and back-up power supplies 136. Also, processor 140 provides PMIC 130 with power supply enable signals 131 and 132, labeled PSEN1 and PSEN2, respectively.

In operation, PMIC 130 provides power to processor 140 using power supplies 134 and back-up power supplies 136. In some embodiments, each of power supplies 134 and 136 includes two conductors: one for a power supply voltage, and one for a reference voltage, such as ground. In other embodiments, each of power supplies 134 and 136 includes a single conductor to provide a power supply voltage, and a separate conductor is provided in common for all of power supplies 134 and 136.

As shown in FIG. 1, power supplies 134 includes N separate supplies, and back-up power supplies 136 includes M separate power supplies. In the various embodiments of the present invention, any number of power supplies 134 and back-up power supplies 136 may be provided to processor 140 by PMIC 130. For example, power supplies 134 may include separate power supply lines to power various portions of processor 140. Power supplies 134 may include a separate power supply to power a processor core within processor 140, an internal memory within processor 140, and other functional blocks within processor 140. Each of power supplies 134 may be at a separate voltage, or each of power supplies 134 may be at a common voltage. In some embodiments, different voltages are provided on power supplies 134 based on power requirements of processor 140. Back-up power supplies 136 may include one or more power supply voltages to provide back-up power to processor 140.

PMIC 130 may generate various voltages for power supplies 134 and 136 in any manner. For example, PMIC 130 may include linear regulators, switching regulators, or the like. In some embodiments, PMIC 130 may be able to turn on and off power supplies 134 and 136 at the request of processor 140. For example, PMIC 130 may enable power supplies 134 when processor 140 asserts PSEN1, and may disable power supplies 134 when processor 140 de-asserts PSEN1. Likewise, PMIC 130 may enable power supplies 136 when processor 140 asserts PSEN2, and may disable power supplies 136 when processor 140 de-asserts PSEN2. When processor 140 is in a reduced power mode such as a "sleep mode," some or all of power supplies 134 or power supplies 136 may be turned off. By asserting PSEN1 and/or PSEN2, processor 140 may request that PMIC 130 turn the power supplies on. As shown in FIG. 1, the power supplies are grouped into two groups: power supplies 134, and backup power supplies 136; and one enable signal is provided to PMIC 130 from processor 140 for each group. In some embodiments, more than two groups of power supplies exist, and more than two power supply enable signals exist. Further, in some embodiments, each power supply may have an enable signal associated therewith. In these embodiments, each power supply may be independently turned on and off.

System 100 is shown with two batteries: back-up battery 110, and main battery 120. In the various embodiments of the present invention, any number of batteries may be utilized. For example, in some embodiments, a single battery is utilized for both main power and back-up power. Also for example, in some embodiments, many batteries are used, and in still further embodiments, a battery charger with components such as a transformer and rectifier may also be used.

Processor 140 includes state machine 142, register 144, timers 162 and 164, and voltage detectors 166 and 168. State machine 142 may operate to determine whether power supplies 134 and backup power supplies 136 are sufficiently ramped up to provide the "supplies ready" signal on node 143. By providing the "supplies ready" signal, state machine 142 may provide an indication to other blocks (not shown) within processor 140 that the power supplies are ready to be used. State machine 142 may utilize various criteria to determine whether power supplies 134 and backup power supplies 136 are ready. For example, state machine 142 may use information from timers and voltage detectors. State machine 142, and the various embodiments thereof, is described in more detail below with reference to FIGS. 3 and 4.

In some embodiments, voltage detectors 166 includes N separate voltage detection circuits to provide separate voltage detection capabilities for each of power supplies 134, and voltage detectors 168 includes M separate voltage detection circuits to provide separate voltage detection capabilities for each of backup power supplies 136. In other embodiments, voltage detectors 166 includes a single voltage detection circuit to detect a voltage on one of power supplies 134, and voltage detectors 168 includes a single voltage detection circuit to detect a voltage on one of backup power supplies 136.

In some embodiments, voltage detectors 166 may provide N output signals to state machine 142, where each output signal corresponds to one of power supplies 134. In other embodiments, voltage detectors 166 may provide one output signal to state machine 142 to represent the state of all of power supplies 134. For example, voltage detectors 166 may include one voltage detector for each of power supplies 134, and output signals from each of voltage detectors 166 may be combined logically using an "and" operation, and the resulting signal may be provided to state machine 142.

In some embodiments, voltage detectors 168 may provide M output signals to state machine 142, where each output signal corresponds to one of the backup power supplies 136. In other embodiments, voltage detectors 168 may provide one output signal to state machine 142 to represent the state of all of backup power supplies 134. For example, voltage detectors 168 may include one voltage detector for each of backup power supplies 136, and output signals from each of voltage detectors 168 may be combined logically using an "and" operation, and the resulting signal may be provided to state machine 142.

Voltage detectors 166 and 168 may include any type of circuitry. For example, voltage detectors 166 and 168 may include passive components such as capacitors and resistors, active components such as transistors and diodes, or any combination. In operation, voltage detectors 166 detect whether a minimum operating voltage exists on power supplies 134, and provides an indication to state machine 142. For example, in embodiments represented by FIG. 1, when PSEN1 is de-asserted, power supplies 134 may be turned off, and one or more of the voltages on power supplies 134 may be less than the minimum operating voltage required by processor 140. When PSEN1 is asserted, power supplies 134 are turned on, and voltages on power supplies 134 begin to increase, or "ramp up." When the voltage on power supplies 134 has ramped up beyond the minimum operating voltage, voltage detectors 166 provide an indication thereof to state machine 142. Voltage detectors 168 operate in a like manner, and provide an indication of the state of backup power supplies 136 to state machine 142.

Timers 162 and 164 provide a mechanism to measure a period of time, and to provide state machine 142 with an indication that the period of time has expired. For example, timers 162 and 164 may be implemented using preloadable digital counters that count down after being preloaded using values held in register 144. When the count equals zero, the time period has expired, and the timer provides an indication thereof to state machine 142. In some embodiments, timers 162 and 164 may operate independently. For example, timers 162 and 164 may be loaded with different values such that each of timers 162 and 164 implements a timer measuring a different period of time.

Register 144 may be a configuration register that includes fields that specify the amount of time that each of timers 162 and 164 measure. Further, register 144 may include one or more control bits or status bits provided to state machine 142. For example, register 144 may include one or more control fields to specify whether the outputs of voltage detectors 166 and 168 should be ignored when determining whether to indicate that the power supplies are ready. Further, register 144 may include one or more control fields to specify whether timers 162 and 164 should be utilized when determining whether to indicate that the power supplies are ready. Register 144, and the various embodiments thereof, is described in more detail below with reference to FIG. 2.

Processor 140 is shown with a limited number of functional blocks. In some embodiments, processor 140 includes many more functional blocks. For example, processor 140 may include an arithmetic logic unit (ALU), an execution pipeline, control circuitry, and the like. Each of the blocks shown within processor 140 may influence, or maybe influenced by, software being executed within processor 140. For example, in some embodiments, PSEN1 and PSEN2 may be asserted under software control, and in other embodiments, PSEN1 and PSEN2 may be asserted by state machine 142 or other control circuitry. Further, in some embodiments, portions of the blocks shown in processor 140 may be implemented in software or in a combination of hardware and software. The various embodiments of the present invention are not limited in this respect.

Memory 150 represents an article that includes a machine readable medium. For example, memory 150 represents any one or more of the following: a hard disk, a floppy disk, random access memory (RAM), read only memory (ROM), FLASH memory, CDROM, or any other type of article that includes a medium readable by processor 140. Memory 150 can store instructions for performing the execution of the various method embodiments of the present invention.

In operation, processor 140 reads instructions and data from memory 150 and performs actions in response thereto. For example, processor 140 may read from, or write to, register 144 in response to instructions read from memory 150. Also for example, processor 140 may access instructions from memory 140 when a reduced power mode is to be entered, and may de-assert one or both of PSEN1 and PSEN2.

Although processor 140 and memory 150 are shown separate in FIG. 1, embodiments exist that combine the circuitry of processor 140 and memory 150 in a single integrated circuit. For example, memory 150 may be an internal memory within processor 140 or may be a microprogram control store within processor 140.

Figure 2:
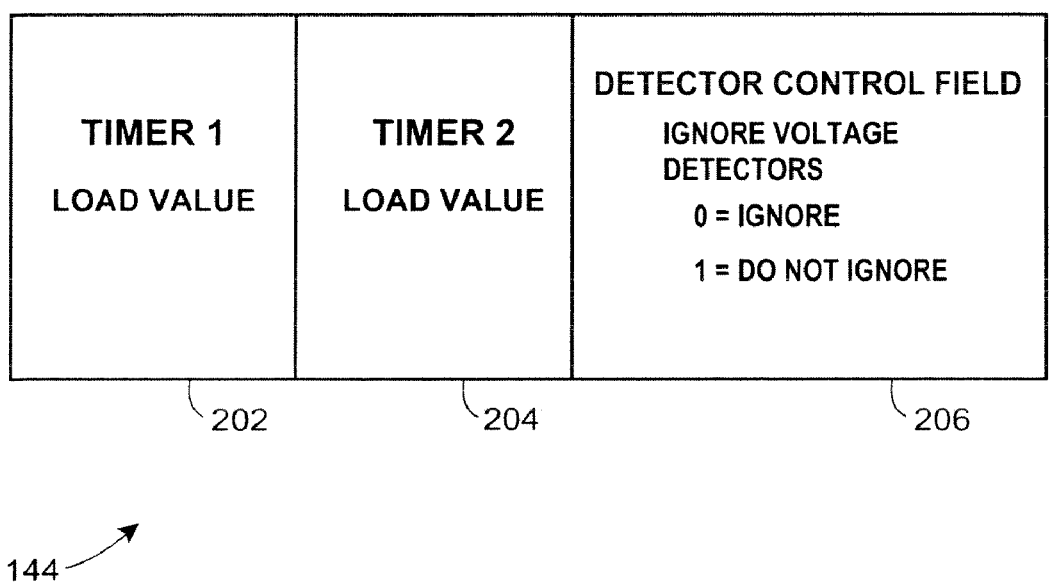
FIG. 2 shows a register.

FIG. 2 shows a register in accordance with various embodiments of the present invention. Register 144 is shown in FIG. 2 including timer load value 202, timer load value 204, and detector control field 206. Timer load value 202 is a value that gets loaded into timer 162 (FIG. 1) when a power supply ramp up process is started. Likewise, timer load value 204 is loaded into timer 164 when the power supply ramp up process is started. Timer load values 202 and 204 are fields within register 144, and may be of any length. In some embodiments, timer load values 202 and 204 are numbers that represent a number of clock cycles having a particular period. For example, a time-keeping oscillator may run at a particular frequency, and each count of timer load values 202 and 204 may correspond to one period of the oscillator signal, although the various embodiments of the present invention are not so limited.

Timer load values 202 and 204 correspond to the amount of time a processor will wait after enabling power supplies and before indicating the power supplies are ready. Detector control field 206 specifies whether state machine 142 (FIG. 1) ignores the output of voltage detectors when determining whether power supplies have ramped up. For example, when detector control field 206 is set to "ignore," a state machine responsive to register 144 will only take into account timers when determining if power supplies have fully ramped up. Alternatively, when detector control field 206 is set to "do not ignore," a state machine will take into account voltage detector outputs as well as timer outputs. In some embodiments, detector control field 206 is one bit in length. For example, one bit within detector control field 206 may be used to specify whether to ignore all voltage detectors. In other embodiments, detector control field 206 is more than one bit in length. For example, detector control field 206 may include a first control bit specifying whether to ignore one group of voltage detectors, and may include a second control bit specifying whether to ignore another group of voltage detectors. In still further embodiments, multiple detector control fields exist.

Figure 3:
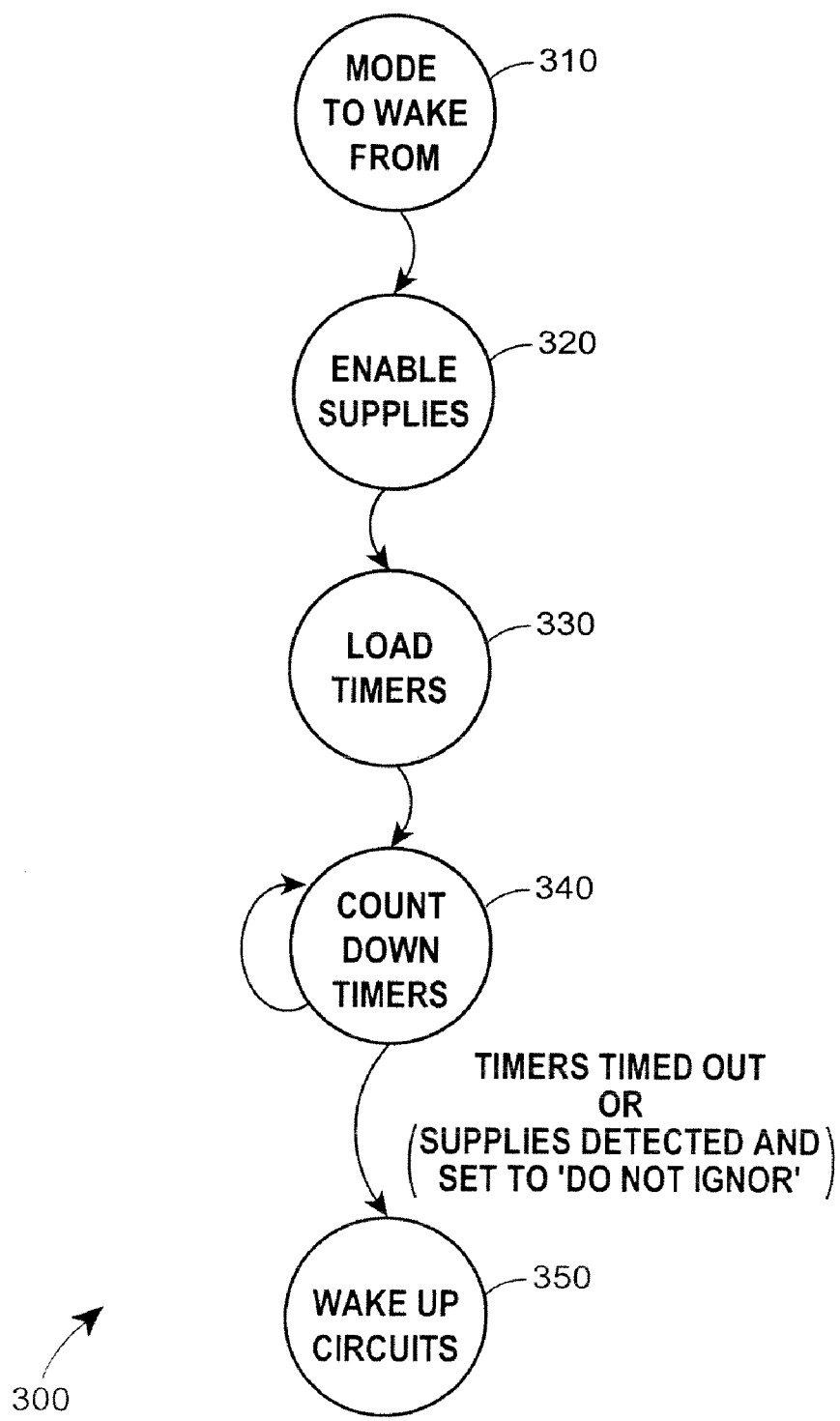
FIGS. 3 and 4 show state machine diagrams.

FIG. 3 shows a state machine diagram in accordance with various embodiments of the present invention. In some embodiments, state machine diagram 300 corresponds to the operation of any of the various state machine embodiments described herein. For example, state machine diagram 300 may correspond to the operation of state machine 142 (FIG. 1). As used herein, the term "state machine" may refer to an article of hardware, such as state machine 142 (FIG. 1). The term "state machine" may also refer to acts performed by hardware or by a hardware/software combination. For example, state machine diagram 300 may also be referred to as a state machine.

State 310 represents a mode that a processor may be in, and a mode that a processor may wake from. For example, state 310 may represent any reduced power mode that a processor may enter. In some embodiments, this may correspond to a reduced power mode that has a subset of the available power supplies turned off, or may correspond to a power saving mode that has all of the power supplies turned off. When waking from the mode represented by state 310, state machine 300 transitions to state 320 where supplies are enabled. This may correspond to asserting power supply enable signals, such as PSEN1 and PSEN2, as shown in FIG. 1.

At state 330, the timers are loaded and at state 340, the timers count down. The timers referred to in states 330 and 340 may correspond to timers 162 and 164 (FIG. 1). The timers may be loaded using timer load values 202 and 204 from register 144 (FIG. 2). State machine 300 will exit state 340 when the timers have timed out. State machine 300 will also exit state 340 when the power supplies are detected, and the detector control field 206 is set to "do not ignore." At state 350, the power supplies are ready and the processor executing state machine 300 may wake up circuits.

State machine 300 provides a processor an ability to set a time delay between enabling power supplies and waking up circuits, and also allows the time delay to be shortened if the power supplies are detected to have ramped up more quickly. In some embodiments, the time delays and the control fields in register 144 are set by a manufacturer, and are not available to be modified by an end user or a systems integrator. In other embodiments, the timer values and control fields are available to modified, allowing systems integrators and end users to adjust the behavior of state machine 300.

Figure 4:
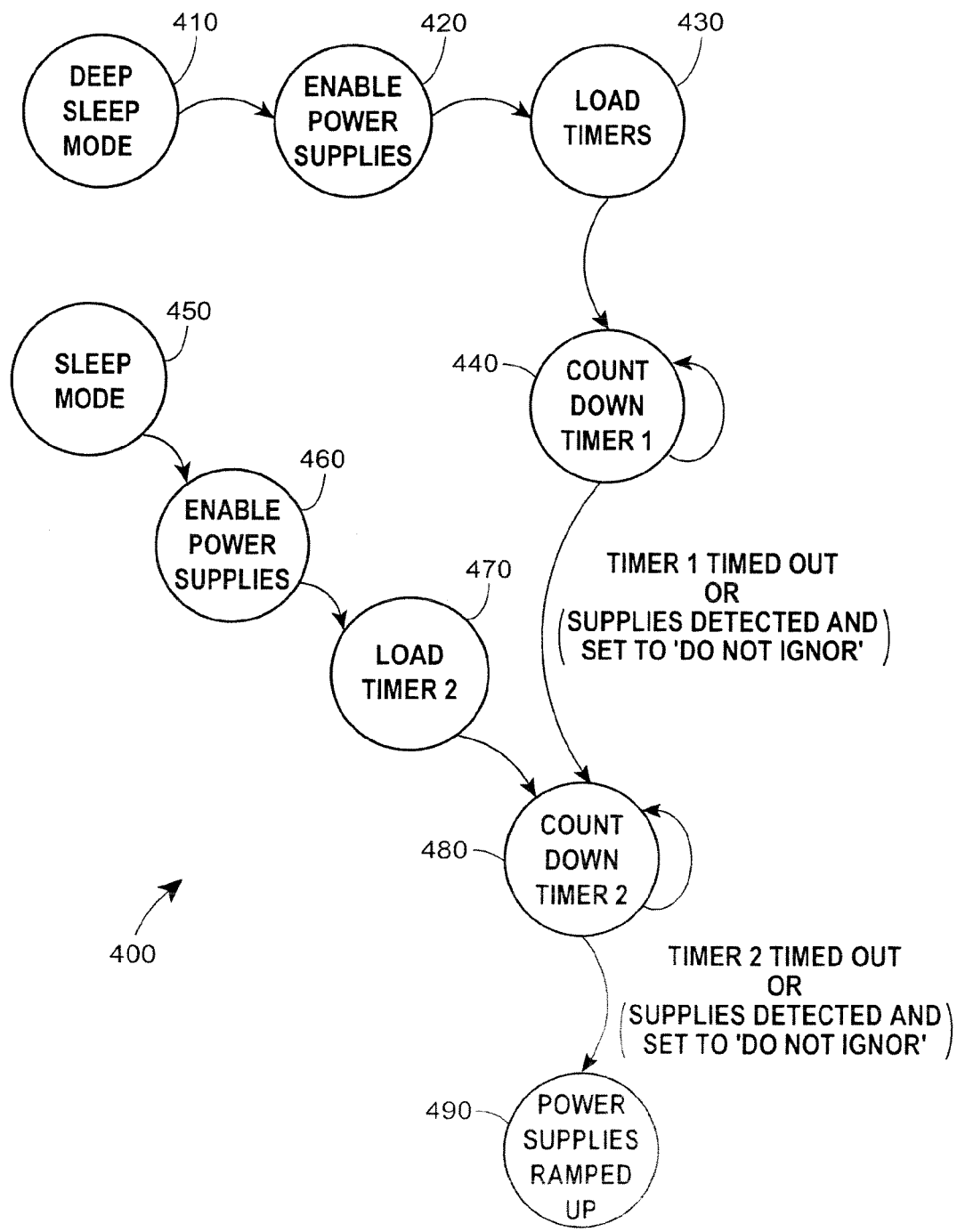

FIG. 4 shows a state machine diagram in accordance with various embodiments of the present invention. State machine 400 begins in either state 410 or state 450 when a processor is in either a deep sleep mode or a sleep mode. When in deep sleep mode at state 410, a processor may begin the process of ramping up the power supplies by enabling power supplies at state 420. This may correspond to asserting power supply enable signals PSEN1 and PSEN2 (FIG. 1). Further, a processor may load timers at state 430. This may correspond to loading timers 162 and 164 from timer load values within register 144. As shown in FIG. 4, state 430 is entered after state 420, but this is not a limitation of the present invention. For example, loading the timers may occur before or concurrently with enabling power supplies.

At state 440, timer 1 counts down. In some embodiments, timer 1 is used to set a maximum delay to wait for one group of power supplies to ramp up. For example, timer 1 may correspond to the maximum ramp up time of either power supplies 134 or backup power supplies 136 (FIG. 1). State machine 400 leaves state 440 when timer 1 has timed out. This corresponds to the passing of a period of time specified by timer load value 202 in register 144 (FIG. 2). State machine 400 will also exit state 440 if voltage detectors have detected that the power supplies have ramped up and the detector control field 206 within register 144 is set to "do not ignore."

When state machine 400 exits state 440, it enters state 480 where timer 2 continues to count down. State 480 may also be entered from the left side of the diagram in FIG. 4 which includes states 450, 460, and 470. When in state 450, the processor is in a sleep mode and power supplies are enabled at state 460, and timer 2 is loaded at state 470. When a processor begins state machine 400 in sleep mode 450, only one of the two timers is loaded and only one of the two timers is set to count down. This is shown at states 470 and 480. State machine 400 will exit state 480 when timer 2 times out. This corresponds to a period of time equal to the time specified by timer load value 204. State machine 400 will also exit state 480 when voltage detectors have detected that the power supplies have ramped up, and detector control field 206 in register 144 is set to "do not ignore."

In some embodiments, deep sleep mode 410 may correspond to a reduced power mode in which all power supplies are powered down. For example, referring now back to FIG. 1, during a deep sleep, PSEN1 and PSEN 2 may both be de-asserted, and power supplies 134 and backup power supplies 136 may be turned off. When waking from a deep sleep, one timer is set for power supplies 134, and another timer is set for backup power supplies 136. Further, each of the timers may be bypassed if the corresponding power supplies have been detected and the control field in register 144 is set accordingly.

In some embodiments, sleep mode 450 may correspond to a reduced power mode in which less than all power supplies are powered down. For example, when in sleep mode 450, one of PSEN1 and PSEN 2 may be de-asserted, and power supplies 134 may turned off while backup power supplies 136 may still be on. When waking from a sleep mode, only the timer corresponding to power supplies 134 is set, and this timer may be bypassed if power supplies 134 have been detected and the control field in register 144 is set accordingly.

In some embodiments, state 480 responds to a control bit in detector control field 206 (FIG. 2) which is separate from the control bit to which state 440 responds. In these embodiments, detector control field 206 may include separate control bits for each group of power supplies, and various states in state machines respond to the separate control bits.

State machine 400 has been described with power supplies in two groups, enabled by two signals, timed by two timers, and detected by two sets of voltage detectors. Any number of power supplies, groups of power supplies, timers, and voltage detectors may be included without departing from the scope of the present invention. For example, a state machine may include states corresponding to more than two reduced power modes, and more than two timers and voltage detectors may be utilized to determine when the power supplies have ramped up.

Figure 5:
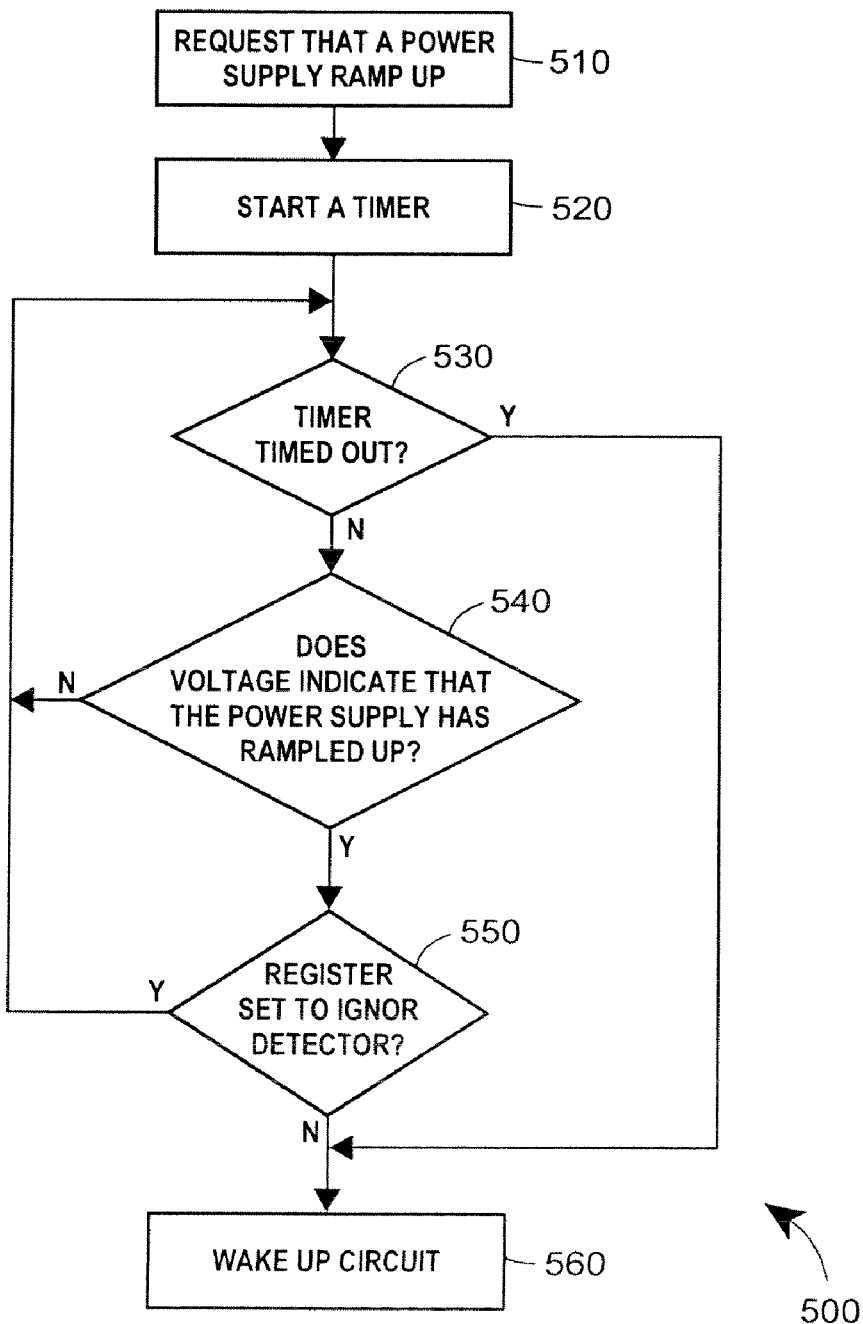
FIG. 5 shows a flowchart in accordance with various embodiments of the present invention.

FIG. 5 shows a flowchart in accordance with various embodiments of the present invention. In some embodiments, method 500, or portions thereof, is performed by a processor or an electronic system, embodiments of which are described with reference to the various figures. In some embodiments, method 500 is performed by a processor or state machine when power supplies are ramped up. The process may be performed when recovering from a reduced power state, or when a device is turned on. Method 500 is not limited by the particular type of apparatus or software element performing the method. The various actions in method 500 may be performed in the order presented, or may be performed in a different order. Further, in some embodiments, some actions listed in FIG. 5 are omitted from method 500.

Method 500 begins at 510 in which a request is performed that a power supply ramp up. In some embodiments, this may correspond to a processor, under either hardware or software control, asserting power supply enable signals such as those shown and described with the various figures. At 520, a timer is started. The timer at 520 may correspond to one or more timers such as timers 162 and 164 (FIG. 1). At 530, if the timer has timed out, then method 500 proceeds to 560 where a circuit is woken up. If, at 530, the timer has not timed out, then method 500 determines if one or more voltage detectors indicate that power supply has ramped up at 540. If the voltage detector indicates that the power supply has ramped up, then if the register is set to not ignore the detector at 550, method 500 wakes up the circuit at 560. If either the voltage detector indicates that the power supply has not ramped up at 540, or the register is set to ignore the detector at 550, then method 500 proceeds back to 530. In some embodiments, the timer referenced at 520 and 530 is a hardware timer such as that shown in FIG. 1. In other embodiments, the timer referenced at 520 and 530 may be a software timer. Further, in some embodiments, all of method 500 corresponds to software executing on a processor, such as processor 140 (FIG. 1).

In some embodiments, method 500 may correspond to enabling a group of power supplies. For example, a group of power supplies such as power supplies 134 may be enabled, and method 500 may determine when a circuit should be woken up based on the state of the group of power supplies. In some embodiments, method 500 may correspond to enabling multiple groups of power supplies. For example, power supplies 134 and backup power supplies 136 may be enabled, and method 500 may determine when a circuit should be woken up based on the states of both groups of power supplies. In these embodiments, multiple timers may be started at 520, and 530 may correspond to determining if either timer has timed out. In some embodiments, portions of method 500 may be duplicated and performed in parallel corresponding to multiple timers and multiple voltage detectors.

Figure 6:
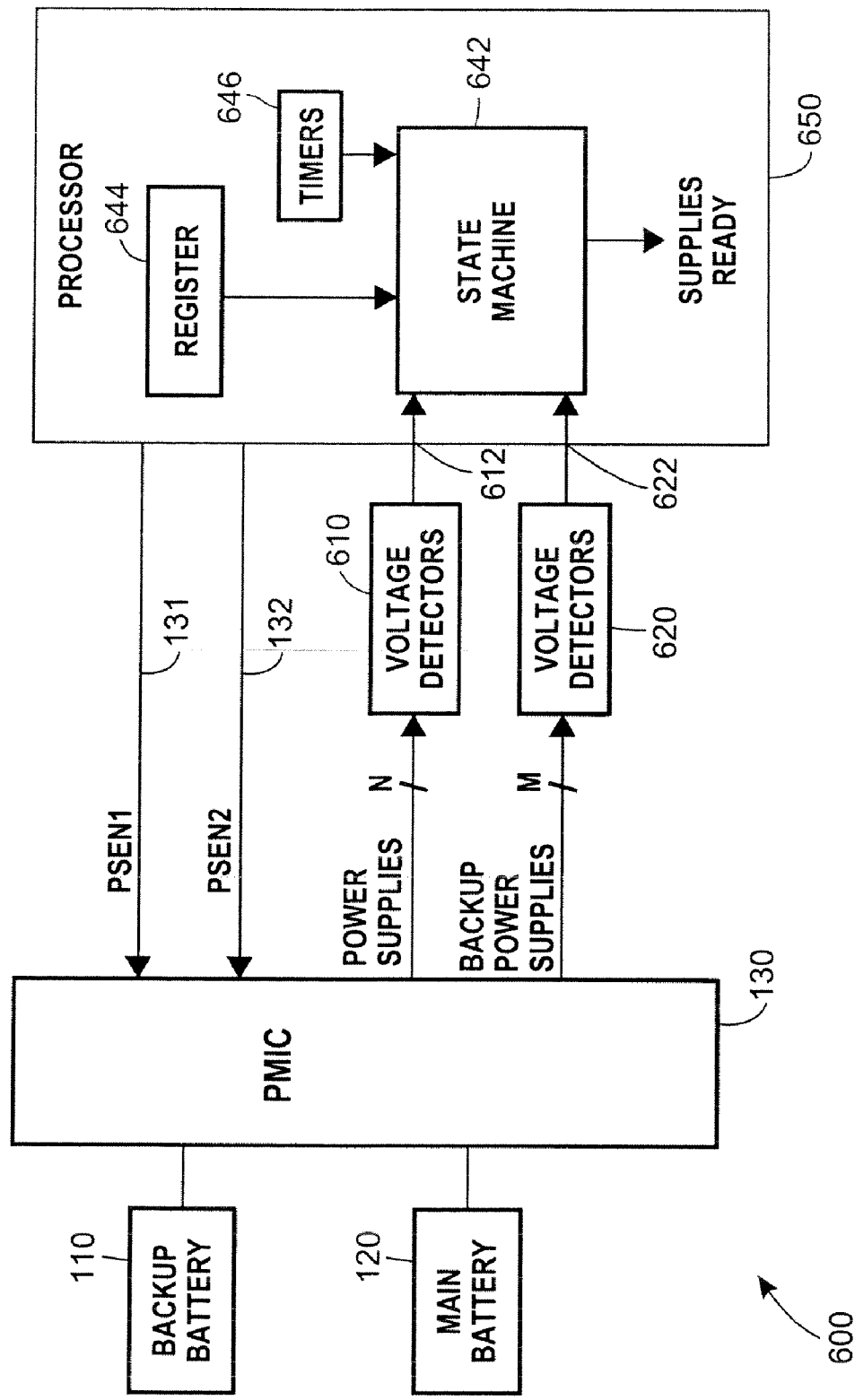
FIGS. 6 and 7 show electronic systems in accordance with various embodiments of the present invention.

FIG. 6 shows an electronic system in accordance with various embodiments of the present invention. Electronic system 600 includes back-up battery 110, main battery 120, and PMIC 130, all of which are described above with reference to FIG. 1. Electronic system 600 also includes voltage detectors 610 and 620, and processor 650. Processor 650 includes state machine 642, register 644, and timers 646. In some embodiments, register 644 corresponds to register 144 (FIGS. 1, 2), and timers 646 correspond to timers 162 and 164 (FIG. 1). Further, state machine 642 may correspond to state machine 142 (FIG. 1), and may operate in accordance with any of the state machine embodiments described herein, including those shown in FIGS. 3 and 4.

Voltage detectors 610 and 620 correspond in operation to voltage detectors 166 and 168, respectively. Voltage detectors 610 and 620 may be implemented with any type of circuit external to processor 650. For example, voltage detectors 610 and 620 may be implemented using discrete circuitry, or may be implemented in integrated circuits. The manner in which voltage detectors 610 and 620 are implemented is not a limitation of the present invention. Processor 650 receives signals from voltage detectors 610 and 620 at external signal nodes 612 and 622.

Figure 7:
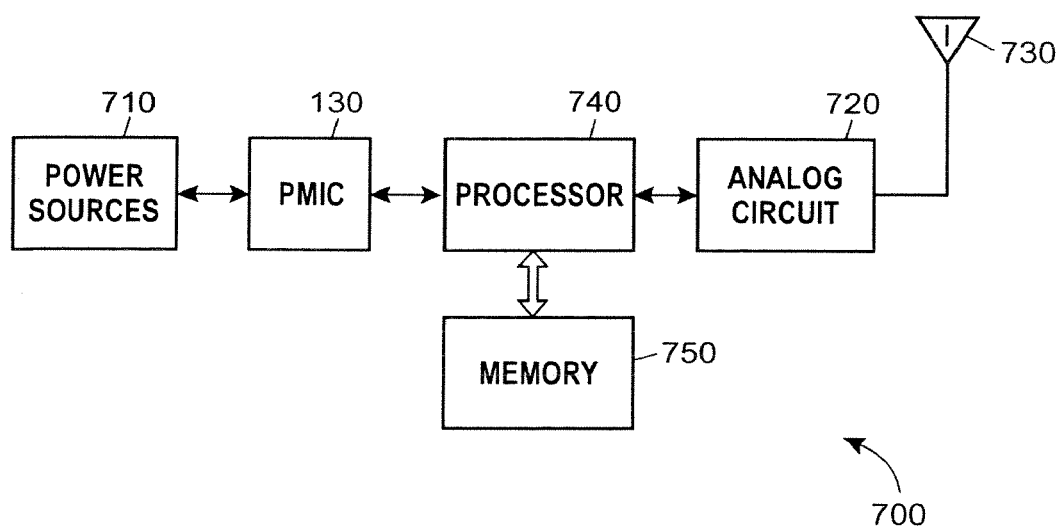

FIG. 7 shows a system diagram in accordance with various embodiments of the present invention. Electronic system 700 includes processor 740, memory 750, power mode integrated circuit (PMIC) 130, power sources 710, analog circuit 720, and antenna 730. Power sources 710 may include any type of power sources, including batteries, power supplies, charging circuits, or the like. In some embodiments, power sources 710 includes main battery 120 and backup battery 110 (FIG. 1). PMIC 130 is described above with reference to FIG. 1.

Processor 740 may be any type of processor that includes an ability to detect whether power supplies have ramped up using timers or voltage detectors. For example, in some embodiments, processor 740 corresponds to processor 140 (FIG. 1), and in other embodiments, processor 740 corresponds to processor 650 (FIG. 6). Memory 750 may be any type of memory accessible by processor 740. In some embodiments memory 750 may be part of processor 740. For example, memory 750 may be a cache memory within processor 740, or a non-volatile memory within processor 740.

Example systems represented by FIG. 7 include cellular phones, personal digital assistants, wireless local area network interfaces, or any other system that include a processor and an antenna. Many other systems uses exist for processor 740, PMIC 130, and the various power supply detection mechanisms herein described. For example, processor 740 may be used in a desktop computer, a network bridge or router, or any other system without an antenna.

Analog circuit 720 communicates with antenna 730 and processor 740. In some embodiments, analog circuit 720 includes a physical interface (PHY) corresponding to a communications protocol. For example, analog circuit 720 may include modulators, demodulators, mixers, frequency synthesizers, low noise amplifiers, power amplifiers, and the like. In some embodiments, analog circuit 720 may include a heterodyne receiver, and in other embodiments, analog circuit 720 may include a direct conversion receiver. In some embodiments, analog circuit 720 may include multiple receivers. For example, in embodiments with multiple antennas 730, each antenna may be coupled to a corresponding receiver. In operation, analog circuit 720 receives communications signals from antenna 730, and provides signals to processor 740. Further, processor 740 may provide signals to analog circuit 720, which operates on the signals and then transmits them to antenna 730.

In some embodiments, processor 740 includes circuitry or performs methods to implement error detection/correction, interleaving, coding/decoding, or the like. Also in some embodiments, processor 740 may implement all or a portion of a media access control (MAC) layer of a communications protocol. In some embodiments, a MAC layer implementation may be distributed between processor 740 and digital circuitry (not shown) external to processor 740.

Analog circuit 720 may be adapted to receive and demodulate signals of various formats and at various frequencies. For example, analog circuit 720 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The present invention is not limited in this regard.

Antenna 730 may include one or more antennas. For example, antenna 730 may include a single directional antenna or an omni-directional antenna. As used herein, the term omni-directional antenna refers to any antenna having a substantially uniform pattern in at least one plane. For example, in some embodiments, antenna 730 may include a single omni-directional antenna such as a dipole antenna, or a quarter wave antenna. Also for example, in some embodiments, antenna 730 may include a single directional antenna such as a parabolic dish antenna or a Yagi antenna. In still further embodiments, antenna 730 may include multiple physical antennas. For example, in some embodiments, multiple antennas are utilized to support multiple-input-multiple-output (MIMO) processing or spatial-division multiple access (SDMA) processing.

Although the various elements of system 700 are shown separate in FIG. 7, embodiments exist that combine the circuitry of processor 740, memory 750, PMIC 130 and analog circuit 720 in a single integrated circuit. In some embodiments, the various elements of system 700 may be separately packaged and mounted on a common circuit board. In other embodiments, the various elements are separate integrated circuit dice packaged together, such as in a multi-chip module, and in still further embodiments, various elements are on the same integrated circuit die.

Processors, state machines, registers, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, register 144 may be represented as polygons assigned to layers of an integrated circuit.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    requesting that a power supply ramp up a voltage;
    detecting when the power supply has ramped up the voltage; and
    in response to detecting when the power supply has ramped up the voltage, waking up a sleeping circuit if a control field in a register is in a first state and not waking up the sleeping circuit if the control field in the register is not in the first state.

2. The method of claim 1 further comprising starting a timer.

3. The method of claim 2 wherein conditionally waking up the sleeping circuit comprises:
    if the power supply has ramped up the voltage prior to the timer timing out, and the control field is in a second state, waking up the sleeping circuit; and
    if the timer times out, waking up the sleeping circuit if it has not yet been awakened.

4. The method of claim 1 wherein requesting that a power supply ramp up a voltage comprises requesting that a bank of power supplies ramp up.

5. The method of claim 4 wherein detecting when the power supply has ramped up comprises detecting when all of the bank of power supplies has ramped up.

6. The method of claim 1 wherein requesting that a power supply ramp up a voltage comprises requesting that two banks of power supplies ramp up.

7. The method of claim 6 wherein detecting when the power supply has ramped up comprises detecting when all of the power supplies in a first bank has ramped up and detecting when all of the power supplies in a second bank has ramped up.

8. The method of claim 7 further comprising:
    starting a first timer corresponding to the first bank; and
    starting a second timer corresponding to the second bank.

9. The method of claim 8 wherein conditionally waking up the sleeping circuit comprises:
    if the first bank of power supplies has ramped up prior to the first timer timing out, and the control field is in the first state, providing an indication that the first bank has ramped up;
    if the first timer times out, providing the indication that the first bank has ramped up;
    if the second bank of power supplies has ramped up prior to the second timer timing out, and the control field is in the first state, providing an indication that the second bank has ramped up;
    if the second timer times out, providing the indication that the second bank has ramped up; and
    when the first and second indications have been provided, waking up the sleeping circuit.

10. A processor comprising a state machine to determine when a power supply is ready, wherein the state machine is responsive to a timer that specifies a time to wait and is responsive to a signal from a voltage detection circuit that detects the condition of the power supply;

wherein the state machine is further responsive to a field in a configuration register, and wherein the state machine provides an indication that the power supply is ready when the timer times out or when the voltage detection circuit indicates that the power supply is ready and the field in the configuration register is set to indicate that the voltage detection circuit is not to be ignored;

wherein the state machine ignores the voltage detection circuit when the voltage detection circuit indicates that the power supply is ready and a field in the configuration register is set to indicate that the voltage detection circuit is to be ignored.

11. The processor of claim 10 further comprising the voltage detection circuit.

12. The processor of claim 10 further comprising an external signal node to receive the signal from the voltage detection circuit.

13. The processor of claim 10 wherein the state machine is responsive to a plurality of signals from voltage detection circuits that detect voltages of a plurality of power supplies.

14. The processor of claim 13 wherein the plurality of power supplies are grouped into two groups, and the state machine is responsive to one signal corresponding to each of the two groups.

15. A processor comprising:
a register to hold a first control bit corresponding to a first group of at least one power supply, and a second control bit corresponding to a second group of at least one power supply; and
a state machine coupled to the register to receive values of the first and second control bits, and to use different criteria to determine states of the power supplies based on the values of the first and second control bits;
wherein the different criteria include an output of a first voltage detector corresponding to the first group of at least one power supply and an output of a second voltage detector corresponding to the second group of at least one power supply;
wherein the state machine conditionally ignores the output of the first voltage detector based on a value of the first control bit and ignores the output of the second voltage detector based on a value of the second control bit.

16. The processor of claim 15 wherein the different criteria include a timer.

17. The processor of claim 16 wherein the control register includes a field to program the timer.

18. The processor of claim 17 further comprising the first voltage detector and the second voltage detector.

19. The processor of claim 15, wherein the first voltage detector comprises a plurality of individual voltage detectors to detect power supply voltages of the first group;

wherein the different criteria include outputs of the plurality of individual voltage detectors;

wherein the state machine conditionally ignores the outputs of voltage detectors in the plurality of individual voltage detectors based on the value of the first control bit.

20. The processor of claim 15 further comprising a first timer corresponding to the first group and a second timer corresponding to the second group, the first and second timers coupled to provide signals to the state machine as criteria to determine states of the power supplies.

21. An electronic system comprising:
an antenna;
an analog circuit coupled to the antenna; and
a processor comprising a state machine to determine when a power supply is ready, wherein the state machine is responsive to a timer that specifies a time to wait and is responsive to a signal from a voltage detection circuit that detects the condition of the power supply;
wherein the processor includes a configuration register, and the state machine conditionally ignores the signal from the voltage detection circuit based on a value of a control field in the configuration register.

22. The electronic system of claim 21 wherein the state machine is responsive to a plurality of signals from voltage detection circuits that detect voltages of a plurality of power supplies.

23. The electronic system of claim 22 wherein the plurality of power supplies are grouped into a first group and a second group, and the state machine is responsive to a first single signal from a voltage detection circuit corresponding to the first group and a second single signal from a voltage detection circuit corresponding to the second group.

24. The electronic system of claim 22 wherein the plurality of power supplies are grouped into a first group and a second group, and the state machine is responsive to a first plurality of signals from voltage detection circuits corresponding to the first group and a second plurality of signals from voltage detection circuits corresponding to the second group.

25. The processor of claim 15, wherein the first voltage detector comprises a plurality of individual voltage detectors to detect power supply voltages of the first group;

wherein the output of the first voltage detector is a single output corresponding to all of the individual voltage detectors in the plurality of individual voltage detectors.

* * * * *